(12) United States Patent
Lala (10) Patent No.: US 8,191,083 B2
(45) Date of Patent: May 29, 2012

(54) EXECUTING STATE MACHINE PROCESSING MODULES WITH AN EXECUTIVE PROCESSING MODULE

(75) Inventor: Nazim I. Lala, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1008 days.

(21) Appl. No.: 12/146,228

(22) Filed: Jun. 25, 2008

(65) Prior Publication Data

US 2009/0328069 A1     Dec. 31, 2009

(51) Int. Cl.
*G06F 9/44* (2006.01)
*G06F 9/46* (2006.01)
*G06F 15/16* (2006.01)

(52) U.S. Cl. .................. 719/318; 709/201; 717/168

(58) Field of Classification Search .................. None
See application file for complete search history.

(56) References Cited

U.S. PATENT DOCUMENTS

| | | |
|---|---|---|
| 6,553,403 B1 | 4/2003 | Jarriel et al. |
| 7,103,874 B2 | 9/2006 | McCollum et al. |
| 7,200,662 B2 | 4/2007 | Hasan et al. |
| 2003/0120502 A1 | 6/2003 | Robb et al. |
| 2003/0217332 A1 | 11/2003 | Smith et al. |
| 2005/0114494 A1 | 5/2005 | Beck et al. |
| 2006/0041637 A1 | 2/2006 | Jerrard-Dunne |
| 2006/0236308 A1* | 10/2006 | Lamb et al. ............ 717/121 |

FOREIGN PATENT DOCUMENTS

WO    WO02/102093    * 12/2002

OTHER PUBLICATIONS

"An Access Control Language for Web Services," by Emin Gun Sirer and Ke Wang, Computer Science Department, Cornell University, Ithaca, New York, 8 pgs. [online] [retrieved on Apr. 25, 2008]. Retrieved from the Internet: http://www1.cs.columbia.edu/~kewang/paper/sacmat02.pdf.

"Oceano-SLA Based Management of a Computing Utility," by K. Appleby, S. Fakhouri, L. Fong, G. Goldszmidt, M. Kalantar, S. Krishnakumar, D.P. Pazel, J. Pershing, and B. Rochwerger; IBM T. J. Watson Research Center, Yorktown Heights, New York; 14 pgs. [online] [retrieved on Apr. 25, 2008]. Retrieved from the Internet: http://atlanta.postech.ac.kr/sla-mgmt/refpapers/009%20Oceano-SLA%20based%20management%20of%20a%20computing%20utility.pdf.

(Continued)

*Primary Examiner* — Qing Wu
(74) *Attorney, Agent, or Firm* — Workman Nydegger (57) ABSTRACT

An application that uses a state machine for processing can be optimized to process objects efficiently through an alternate, executive processing module. In one implementation, for example, one of the plurality of processing modules in a given state machine can be reconfigured to subscribe to an executive processing module, which, in turn, is subscribed to all events that occur during processing of the given state machine. When the corresponding state machine is tasked with processing a client request, the executive processing module processes the client request for each subscribed processing module. The executive processing module can optimize processing of the client request for all subscribed processing modules, and can further provide human-readable output regarding processing details of the same.

21 Claims, 3 Drawing Sheets

OTHER PUBLICATIONS

"An Expert System for Analyzing Firewall Rules," by Pasi Eronen and Jukka Zitting, Helsinki University of Technology, Helsinki, Finland; 8 pgs. [online] [retrieved on Apr. 25, 2008]. Retrieved from the Internet: http://www.niksula.hut.fi/~peronen/publications/nordsec_2001.pdf.

"A Framework for the Application of Association Rule Mining in Large Intrusion Detection Infrastructures," by James J. Treinen and Ramakrishna Thurimella; IBM Global Services, Boulder, Colorado; Copyright 2006 Springer-Verlag Berlin Heidelberg; 18 pgs. [online] [retrieved on Apr. 25, 2008]. Retrieved from the Internet: http://web.cs.du.edu/~jamestr/publications/TreinenThurimellaRAID2006.pdf.

"BizTalk Server Business Rules Framework," Author Unknown, May 3, 2005; Microsoft TechNet; 5 pgs. [online] [retrieved on Apr. 25, 2008]. Retrieved from the Internet: http://www.microsoft.com/technet/prodtechnol/biztalk/biztalk2004/planning/business-rules-framework-overview.mspx.

* cited by examiner

EXECUTING STATE MACHINE PROCESSING MODULES WITH AN EXECUTIVE PROCESSING MODULE

CROSS-REFERENCE TO RELATED APPLICATIONS

N/A

BACKGROUND

1. Background and Relevant Art

Conventional applications that use a state machine model for processing objects handle the various objects (e.g., client requests) through a number of different, successive processing modules in a processing chain. With a state machine model, each processing module processes the object, and stores some state for the object, as the object passes from one processing module to the next in the processing chain. Some common examples of applications that use a state machine model for processing include web servers and firewalls.

For example, a web server or a firewall application may receive a request (e.g., the aforementioned object) from another client system, such as a request to access services maintained through the web server, or to access services behind the firewall. The web server or firewall application, in turn, may process the request through a first processing module that produces a time stamp on the request, while another, subsequent processing module determines various metrics about the request (e.g., packet size, communication protocol used in transmission, etc.) Upon processing the request, each processing module passes the request through to the next processing module in the processing chain until reaching the last processing module in the chain, and thus a completed set of states for the client request.

In conventional systems, each processing module in the aforementioned example will need to finish processing the request before passing the client request onto the next processing module, and so forth. In some cases, however, finishing the processing request may not be a simple, quick matter. For example, a given processing module may only be able to process the request in the context of one or more conditions. Specifically, the given processing module may have subscribed to various system "events" that need to occur as part of the processing module's processing configuration, and thus before completion for the particular processing module.

For example, as in the above example, a processing module that is adding a time stamp to an incoming request may need to wait for an internal signal from the system that a clock event has been updated, before obtaining the current time. Another processing module might need confirmation from another event that some credentials presented in the client request have been verified. Similarly, another processing module might some confirmation that a list of valid URLs has been updated. With respect to a web server application, there may even be some similarity in the events needed for a security processing module that blocks/reroutes traffic and a URL rewriter processing module that also reroutes traffic. Of course, there can also be a number of different events to which each processing module subscribes, and the number and types of events that can occur in a system can vary widely.

Unfortunately, because each processing module in a particular processing chain can affect or change the received client request, one will also appreciate that there may be instances in which processing by one processing module on a particular client request adversely affects how a subsequent processing module in the processing chain processes the same request. Complicating this is the notion that the ordering of processing modules in a given processing chain for a state machine tends to be arbitrary. One reason for this is that, when a developer is creating a processing module for a particular processing chain, the developer often has difficulty identifying the functions and results of other processing modules in the processing chain.

Typically all that a developer can know about other processing modules in a given processing chain is the name of the processing modules, and, in some cases, the identity of the events to which they subscribe. To obtain more information than this (e.g., how the module processes in view of events), a developer might even run a series of tests to determine how the processing modules process a particular request at certain intervals. This can involve some fairly complex interactions in which the developer initiates processing of a request through a processing chain, and arbitrarily stops processing midway through the processing chain to determine what has happened.

Thus, one will appreciate that it can be difficult to accurately determine how other processing modules, particularly those other than the ones created by a developer, work in a particular processing chain. As a result, and to ensure that a new processing module will work as intended, developers tend to place their newly created processing modules at the beginning of a particular processing chain. As previously mentioned, however, this sort of ordering ultimately results in arbitrary ordering of modules over time, as developers continually place their new processing modules at the head of a given processing chain.

One will appreciate that this sort of arbitrary ordering can have adverse consequences to the efficiency of the web server's processing chain. For example, there may be many processing modules that require few or no events to occur before completing processing of a particular object/request, and these may be at the end of a given processing chain. As a result, processing modules that could or should be processed sooner in a processing chain may not be processed until much later. Similarly, it may be the case that processing modules that need to process the client request in a relatively unmodified state may not be able to process the client request until other processing modules have modified the client request, thus removing important information from the request. As a result, some processing modules farther down the processing chain may only be processing the client request incompletely, or potentially incorrectly.

Accordingly, there are a number of disadvantages with the provisioning and ordering of processing modules using a state machine model that can be addressed.

BRIEF SUMMARY

Implementations of the present invention overcome one or more problems in the art with systems, methods, and computer program products configured to add efficiency to the ordering of modules in a processing chain. In particular, implementations of the present invention provide one or more mechanisms for abstracting the ordering or modules in a processing chain from the developer, and automatically ordering modules in the processing chain efficiently. In addition, implementations of the present invention provide one or more mechanisms for configuring modules in a processing chain so that the means, mechanisms and results of a processing modules execution can be reported in a human-readable, comprehendible way.

For example, a method from the perspective of an executive processing module can involve subscribing to each of a plurality of events that occur during processing of an initial state machine. In this case, the initial state machine comprises a plurality of processing modules that process one or more objects based on one or more of the events. The method can also involve receiving one or more subscriptions from one or more of the processing modules. Each subscribed processing module comprises a different configuration. In addition, the method can involve processing an object/client request based on each different configuration in the one or more subscribed processing modules. Furthermore, the method can involve generating human-readable output that describes what occurs when processing the object in accordance with each different configuration.

In addition to the foregoing, a method from the perspective of the overall system can involve receiving a client request over a network. In this case, the client request is to be handled by an application program. The method can also involve identifying a state machine in the application program to handle the client request with a plurality of processing modules. In addition, the method can involve processing the client request at least in part through one of the plurality of processing modules of an initial state machine. Here, no human-readable output is generated regarding processing activities of the processing module. Furthermore, the method can involve processing the client request at least in part though instructions corresponding to another processing module in the plurality of processing modules. In this case, human-readable output is generated regarding processing activities of the other processing module.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to Implementations of the present invention overcome one or more problems in the art with systems, methods, and computer program products configured to add efficiency to the ordering of modules in a processing chain. In particular, implementations of the present invention provide one or more mechanisms for abstracting the ordering or modules in a processing chain from the developer, and automatically ordering modules in the processing chain efficiently. In addition, implementations of the present invention provide one or more mechanisms for configuring modules in a processing chain so that the means, mechanisms and results of a processing modules execution can be reported in a human-readable, comprehendible way.

Accordingly, and as understood more fully herein, implementations of the present invention provide at least two primary benefits. For example, developers can avoid determinations on where to position modules in a particular processing chain by deferring such determinations to a common executive processing module that automatically handles ordering. As understood more fully herein, for example, the executive processing module can identify each of the events to which processing modules are subscribed, and determine the most efficient and/or effective position for handling the rules and actions associated with a given processing module of a processing chain. In addition, developers can now have more information about what is occurring in a given processing chain of a particular state machine. Specifically, the executive processing module can generate human-readable information for subscribed processing modules about the corresponding processing activities.

To generate this human-readable information, the executive processing module can create an alternate processing chain using two basic construction blocks: (i) rules, and (ii) actions. As understood more fully herein, at least one implementation of a "rule" limits the scope of an "action," while an implementation of an "action" denotes what is to be done if the rule is satisfied. The executive processing module can thus express rules as sets, where one can create unions and intersections of several individual rules to form a greater rule. By contrast, the executive processing module expresses actions as part of a finite state machine, where one can have one or many individual actions being performed in sequence as part of a processing module. These and other concepts are described more fully herein.

Figure 1A:
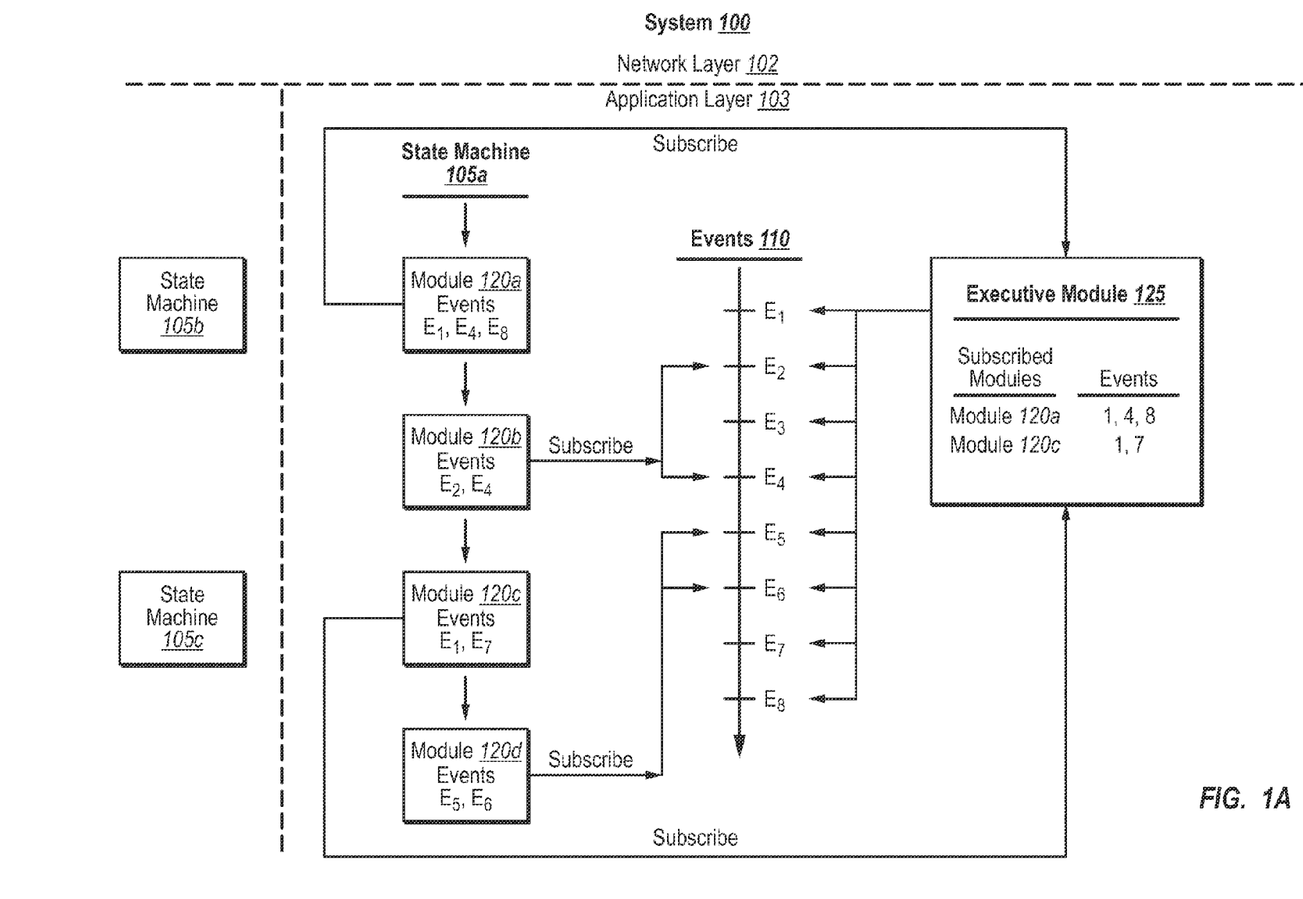
FIG. 1A illustrates an overview schematic diagram in accordance with an implementation of the present invention in which an executive processing module receives subscriptions from other processing modules in a processing chain.

For example, FIG. 1A illustrates an overview schematic diagram of a system 100 in accordance with implementations of the present invention. As shown, system 100 comprises a network layer 102 that interfaces with an application layer 103. In at least one implementation, the application layer 103 comprises a web server, or firewall application program, which is configured to handle certain network requests (e.g., client requests arriving over the network layer 103). Of course, one will appreciate that application layer 103 can comprise any type of application program that implements processing modules in a state machine model. Moreover, the objects described herein need not necessarily arrive from a network layer 102 as such. In particular, the example of a network-based application program is used for purposes of convenience in description.

FIG. 1A further shows that the application layer 103 comprises in this case a plurality of state machines 105, including state machines 105a, 105b, and 105c, etc. In particular, FIG. 1A illustrates an exploded view of state machine 105a, and a generalized view of state machines 105b-c, for purposes of simplicity. In each case, however, one will appreciate that the discussion of processing modules and processing chains with respect to one state machine (e.g., 105a) can be generally applied to any of the other state machines 105(*b-c*) illustrated herein.

In general, FIG. 1A shows that state machine 105a comprises a processing chain of processing modules 120a, 120b, 120c, and 120d. Each processing module 120 in the illustrated processing chain is configured to process objects/requests, etc. from one state to another. That is, processing module 120a is configured with one or more sets of instructions that process an object/request from one state to the next. Similarly, processing module 120b comprises one or more sets of instructions, including rules, actions, etc. to process the object/request from the next state (after processing by module 120) to another subsequent state before handing the object to processing module 120c, and so on. After processing module 120d has processed the object/request, the object/request will be understood as being completely processed through the processing chain for state machine 105a.

Often, the processing from one state to the next by each processing module 120 relies on the occurrence of various "events" 110 in the system 100. Such events can include things as simple as system updates to a clock to more complex events such as confirmations that a list of uniform resource locators (URLs) used in system 100 are valid or updated. In the illustrated case, FIG. 1A shows that each processing module 120a-120d comprises at least a subscription to one or more of the events 110 that can occur while state machine 105a is processing.

For example, FIG. 1A shows that system 100 comprises a series of events 110, denoted as "$E_1$," "$E_2$," "$E_3$," "$E_4$," "$E_5$," "$E_6$," "$E_7$," and "$E_8$." Of these, FIG. 1A shows that processing module 120a is subscribed to events $E_1$, $E_4$, and $E_8$, while processing module 120b is subscribed to events $E_2$, and $E_4$. Similarly, FIG. 1A shows that processing module 120c is subscribed to events $E_1$ and $E_7$, while processing module 120d is subscribed to events $E_5$, and $E_6$. Accordingly, one will appreciate that each of the above-mentioned processing modules 120a-d comprises a "configuration," or "processing configuration" that is based at least in part on corresponding event subscriptions. For example, each processing module 120 comprises a configuration that includes the executable instructions for processing an object/request from one state to the next as well as the events (or other objects) to which the module 120 is subscribed.

At least one deviation from the processing configuration can occur, however, when one processing module or another also subscribes to an executive processing module. For example, FIG. 1A shows that processing modules 120a and 120c differ from processing modules 120b and 120d at least in part since processing modules 120a and 120c have also subscribed to executive processing module 125. For example, processing modules 120a and 120c subscribe to executive processing module 125 during installation. Of course, these particular subscriptions by processing modules 120a and 120c could occur alternatively after installation.

In general, executive processing module 125 comprises a set of one or more computer-executable instructions that effectively perform or mirror the processing configurations of each subscribed processing module (e.g., 120a, 120c). For example, executive processing module 125 can implement the instructions found in a subscribed processing module. To ensure that executive processing module can do so, FIG. 1A shows that executive processing module 125 is subscribed to each of the possible events 100 ($E_1$-$E_8$) that correspond to the illustrated state machine 105a. In at least one implementation, this means that executive processing module 125 does not necessarily need to obtain any new event subscriptions when another processing module 120 subscribes to the executive processing module 125.

In any event, FIG. 1A shows that executive processing module 125 comprises a listing of subscribed modules 120a and 120c. In addition, FIG. 1A shows that executive processing module 125 comprises a listing of the processing configurations for each subscribed module. For example, FIG. 1A shows that executive processing module lists the corresponding events 1, 4, 8 for module 120a, and the events 1 and 7 for module 120c. Executive processing module 125 will thus base its processing on the configurations of processing modules 120a and 120c, and thus at least in part on their correspondingly subscribed events 110.

Figure 1B:
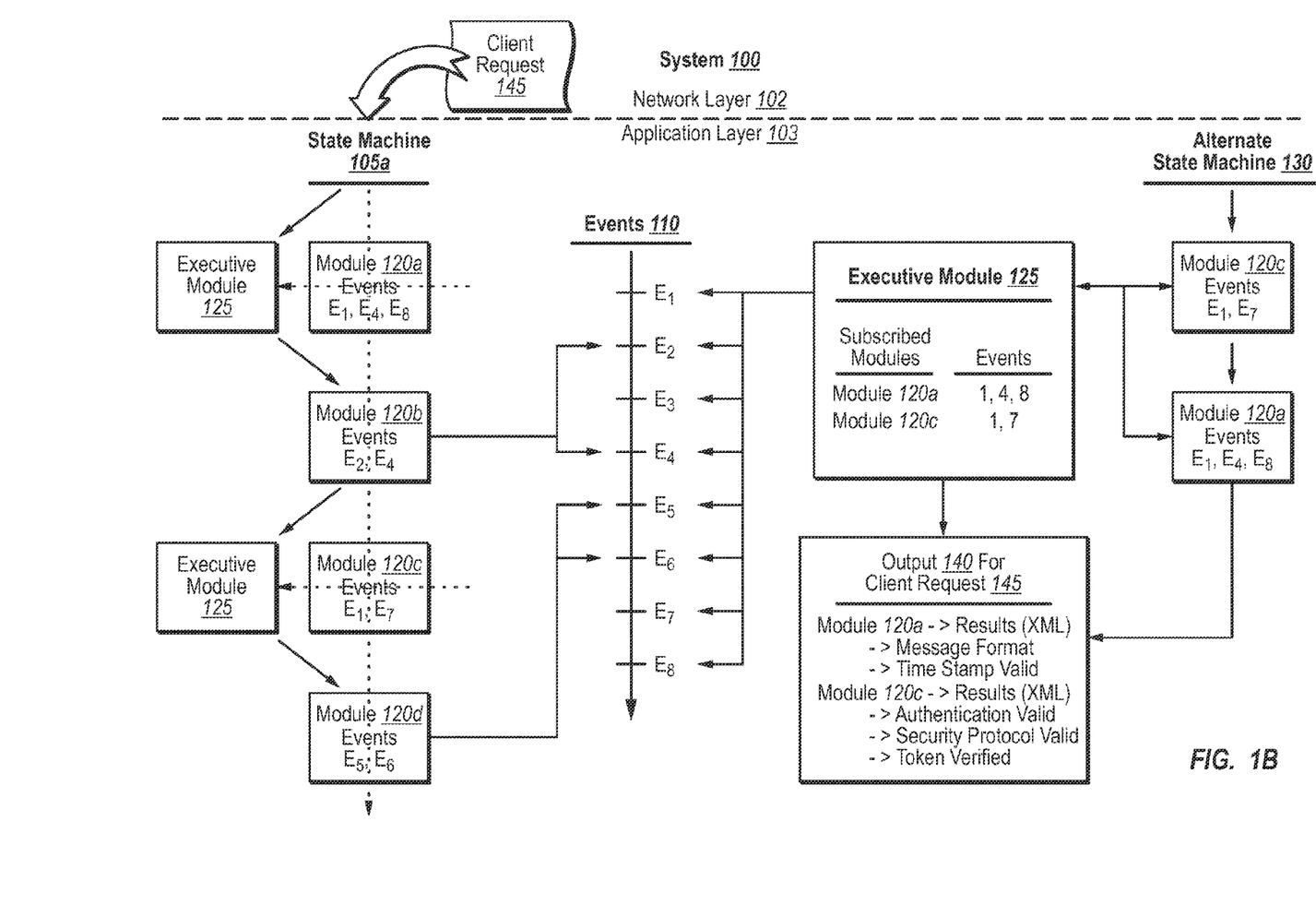
FIG. 1B illustrates the schematic of FIG. 1A in which the system processes a client request at least in part through an executive processing module in accordance with an implementation of the present invention.

FIG. 1B illustrates additional details on how executive processing module 125 handles execution of the subscribed processing modules 120. In general, at least one way that executive processing module 125 processes the actions/processing configurations of a subscribed processing module 120 is by creating an alternate state machine. For example, FIG. 1B illustrates an alternate state machine 130, which has an alternate processing chain (with instructions corresponding to modules 120a and 120c) compared with the state machine 105a processing chain (with modules 120b and 120d).

Furthermore, FIG. 1B illustrates in this case, that alternate state machine 130 comprises a different ordering of the instructions for the subscribed processing modules 120a and 120c compared with their original ordering in state machine 105a. For example, executive processing module 125 may have reordered execution of processing modules 120a and 120c based on what executive processing module 125 deems to be most efficient. Of course, one will appreciate that there are any number of reasons or factors that can enter into the decision making of executive processing module 125 in terms of determining what is most efficient.

For example, executive processing module 125 may determine that the actions of processing module 120c should occur before those of processing module 120a simply because the events 110 subscribed to by processing module 120c generally occur earlier than those for module 120a. In other cases, executive processing module 125 may determine to reorder the actions for processing modules 120a and 120c (compared with state machine 105a) due to the relative delay in receiving signals corresponding to the subscribed events 110 in each case. In either case, it is notable that executive processing module 125 is able to analyze what occurs in each subscribed processing module 120a, 120c, as well as how those actions and events occur.

By way of explanation, the alternate state machine 130 can be built upon two basic construction blocks: rules and actions. As previously mentioned, a "rule" limits the scope of an "action," and can be described using regular expressions for greater flexibility. By contrast, an "action" denotes what is to be done if the rule is satisfied. The executive processing module 125 can express rules in the alternate state machine 130 as sets, which can include unions and intersections of several individual rules to form a greater rule. The executive processing module 125 can also express the actions as chains, which can have one or many individual actions being performed (e.g., alternate state machine 130). The concepts of rules and actions in this particular configuration are discussed more fully below with reference to an XML format. One will of course appreciate that this particular format is chosen arbitrarily for purposes of description, and other programming formats can also be applied.

In any event, a simple rule in accordance with an implementation of the present invention can appear as follows in XML format:

```
<Rule name="foo" operand=":data the condition operates on:"
    condition=":regular expression here:" options="<flag>" />
```

In this example, the operand could be the URL being specified for in the object being processed through state machine 105a (e.g., an HTTP request), or can be a specific HTTP header, etc. The operand could be the data that the "condition" would match against. In addition, "options" in this example could further include how the condition is evaluated (e.g., case-insensitive matching).

In the alternate state machine 130, executive processing module 125 could compose simple rules into a rule set using a union (OR '|'), and/or intersection (AND '&') of simple rules. In such a case, the general requirement might be that the names assigned to simple rules are unique. Thus, given three simple rules named "foo", "bar" and "baz", a rule set could appear as follows:

<RuleSet name="xyz" composition="(foo|bar)&baz">

On the other hand, an action in this example describes what needs to be done in the context of the object being processed (e.g., an HTTP request or response), or describes some modification of the rules. Such rule modifications could include rewriting URLs, constructing responses, and processing other pieces of data. In addition, actions can be configured to essentially operate on data that comes through the HTTP request and response, but would not be limited to such.

For instance, actions can be configured to operate on logging and tracing mechanisms, or to operate on custom third-party code that implements a known interface. As such, a simple action could appear as follows:

```
<Action    name="DoWork"    type==":type    of    action:"
filter=":transformation to apply:" filtertype=":type of filter:" />
```

In this example, a "type" could include such things as (Set|Get)Request, (Set|Get)Response, (Set|Get)Log, or SetNextState. By contrast, a "filter" can comprise the actual transformation to apply to the specified data. In addition, a "filter" in accordance with this example could comprise a regular expression for replace, or could comprise code with a known interface that will operate on the data or the name of the next state to use. This choice could be expressed through the "filtertype".

With the above-described concepts of rules and actions, therefore, executive processing module 125 can construct a "rules engine" such as the illustrated alternate state machine 130. For example, a rules engine can be created that is effectively a new processing module within a finite state machine (e.g., 130). In such a case, the new processing module can thus comprise a "RuleSet", and a sequential list of "Actions". An exemplary state machine processing chain prepared by executive processing module 125 could appear as follows in XML format:

```
< State name="PreBeginRequest" ruleset=":ruleset name:" >
        <Action ... />
        <Action ... />
</ State >
```

As discussed above, executive processing module 125 can vary or alternate the previously intended order of processing the various processing modules 120 in state machine 105a. With respect to the above examples of actions and rules, for example, the executive processing module 125 can rewrite the order of a corresponding action in the prior module (e.g., 120a, 120c) to specifically change the sequence of states (e.g., analogous to processing modules 120). This can be considered the equivalent of a jump instruction. An exemplary web server configuration using the above action/rule examples could thus comprise an alternate state machine 130 as follows:

```
<WebServer>
    <State name="S1" ruleset="xyz">
    ...
    </State>
    <State name="S2" ruleset="abc">
    ...
    </State>
    ...
</WebServer>
```

FIG. 1B illustrates what can thus occur when the application layer 103 receives an object 145, such as the illustrated client request, for processing using principles in accordance with an implementation of the present invention. For example, FIG. 1B shows that application layer 103 receives client request 145, reviews all available state machines 105a, 105b, and 105c, etc., and thus selects state machine 105a for processing. Application layer 103 thus hands off client request 145 to the first processing module 120a of state machine 105a. In the illustrated case, however, since processing module 120a is subscribed to executive processing module 125, the object (i.e., client request 145) is automatically handed (e.g., via a link or hook from processing module 120a) off to executive processing module 125. Executive processing module 125, in turn, handles the client request 145 via the alternate state machine 130.

As previously mentioned, executive processing module 125 can then process the client request 145 any number of ways through the constructed, alternate state machine 130. For example, executive processing module 125 could process client request 145 using essentially the same instructions as those used in subscribed processing modules 120a and 120c, albeit in different order. Specifically, executive processing module 125 could process client request 145 through the instructions of processing module 120c, then of processing module 120a (i.e., the illustrated order in state machine 130). Alternatively, executive processing module 125 could process client request 145 using analogous new instructions that correspond to those of the original processing modules 120a, 120c, using the rules/actions discussed above in the newly constructed alternate state machine 130. Either way, once processed, executive processing module 125 could then pass the processed client request 145 back to state machine 105a.

If necessary, state machine 105a can then processes the now-partially processed request 145 using the remaining processing modules of state machine 105a that have not subscribed to executive processing module 125. For example, state machine 105a could automatically handle the client request 145 through processing modules 120b, etc. When encountering the other subscribed processing module 120c, state machine 105a could again hand the client request 145 back to executive processing module 125. In such a case, executive processing module 125 could then immediately hand the client request 145 back to state machine 105a, since executive processing module 125 would have already processed client request 145 by that point using alternate state machine 130.

In additional or alternative implementations, however, state machine 105a is already aware that processing module 120c (or analogous instructions via executive processing module 125) has already processed client request 145. In this case, state machine 105a could automatically bypass processing module 120c within state machine 105a. State machine 105a could then send the processed client request 145 from processing module 120b directly to processing module 120d.

In addition to the foregoing, FIG. 1B shows that executive processing module 125 can perform additional actions other than simply process a client request 145 in a more efficient order. In particular, executive processing module 125 can be particularly configured to provide human-readable output that would be useful to other developers. For example, FIG. 1B shows that executive processing module 125 generates output in the form of a file, which comprises output 140 corresponding to processing by alternate state machine 130 of client request 145.

Specifically, FIG. 1B shows that processing module 120a (or the analogous instructions in state machine 130) performed the functions of reviewing message formats, and comparing time stamps. In addition, FIG. 1B shows that processing module 120c (or the analogous instructions in state machine 130) performed the functions of user authentication, verification of security protocols, and validation of supplied tokens in client request 145. Of course, there may be many different indications other than those illustrated or described for output 140. Specifically, executive processing module 125 can be configured to describe in output 140 whatever occurs during processing of a particular, subscribed module 120.

Accordingly, FIGS. 1A and 1B, and the corresponding text, illustrate or describe a number of different components and/or modules that can be used to add efficiency to applications that use a state machine model. Furthermore, FIGS. 1A and 1B, and the corresponding text, illustrate or describe a number of different components and modules that can also aid a developer of processing modules in a finite state machine model. Specifically, the use of executive processing module 125 allows developers to not only learn what other processing modules are doing in a state machine 105, but also delegate ordering decisions to a module (e.g., executive processing module 125) that is better equipped to make such decisions.

Figure 2:
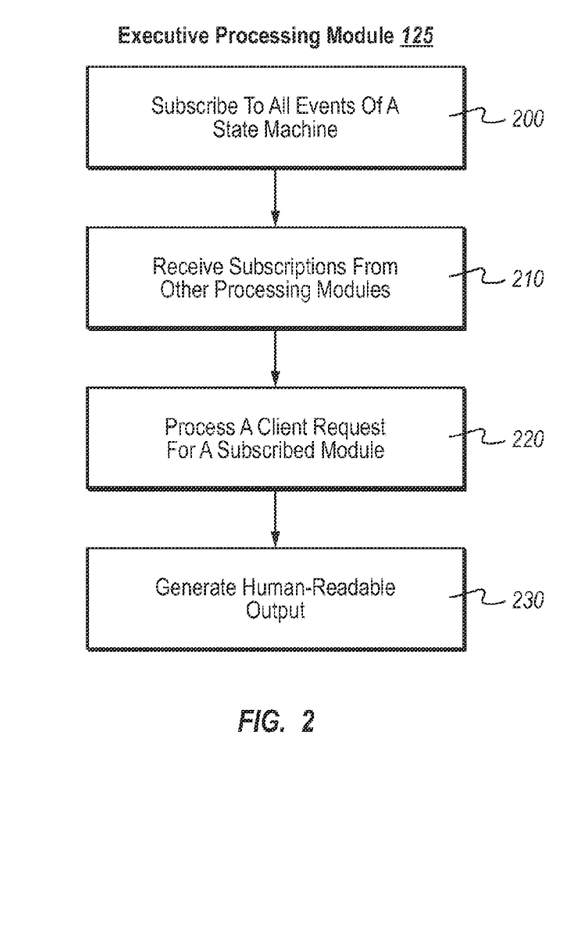
FIG. 2 illustrates a flowchart comprising a series of acts in a method from the perspective of an executive processing module for efficiently processing a client request on behalf of one or more processing modules in a processing chain.
Figure 3:
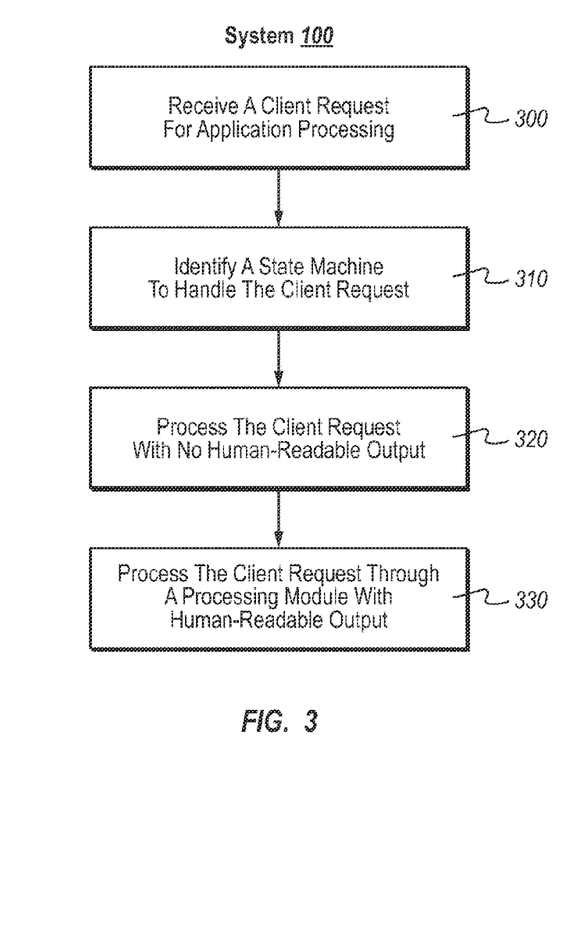
FIG. 3 illustrates a flowchart comprising a series of acts in a method from the perspective of the system for processing a client request at least in part using an executive processing module.

In addition to the foregoing, implementations of the present invention can also be described in terms of flowcharts of methods comprising one or more acts for accomplishing a particular result. For example, FIGS. 2 and 3 illustrate flowcharts of methods from the perspective of an executive processing module 125 and of the overall system 100 for efficiently processing requests in a state machine model. The acts of FIGS. 2 and 3 are described more fully below with respect to the components and diagrams of FIGS. 1A and 1B.

For example, FIG. 2 shows that a method from the perspective of executive processing module 125 can comprise an act 200 of subscribing to all events of a state machine. Act 200 can include subscribing to each of a plurality of events that occur during processing of an initial state machine, wherein the initial state machine comprises a plurality of processing modules that process one or more objects based on the one or more of events. For example, FIG. 1A shows that state machine 105a corresponds to a plurality of events 110 that occur during processing of state machine 105a. Rather than subscribing to only a few of the events, as with the typical processing modules (e.g., 120b), FIG. 1A shows that executive processing module 125 subscribes to each of events $E_1$-$E_8$.

FIG. 2 also shows that the method from the perspective of executive processing module 125 can comprise an act 210 of receiving subscriptions from other processing modules. Act 210 can include receiving one or more subscription requests from one or more of the processing modules, wherein each subscribed processing module comprises a different configuration. For example, FIG. 1A shows that processing modules 120a and 120c subscribe to executive processing module 125. Processing modules 120a and 120c each further include their own different processing configurations, which are based at least in part on their unique configurations to perform processing based on specifically identified events. For example, processing module 120a has a processing configuration that relies on the occurrence of subscribed events $E_1$, $E_4$, and $E_8$, while processing module 120c has a processing configuration based on a subscription to events $E_1$ and $E_7$.

In addition, FIG. 2 shows that the method from the perspective of executive processing module 125 can comprise an act 220 of processing a client request for a subscribed module. Act 220 includes processing a client request based on each different configuration. For example, FIG. 1B shows that executive processing module 125 processes the instructions corresponding to processing modules 120a and 120c, such as when executive application 125 is called in state machine 105a. As previously mentioned, however, executive application 125 is not necessarily limited to processing the actions of processing modules 120a and 120c in the same order originally listed for state machine 105a.

Furthermore, FIG. 2 shows that the method from the perspective of executive processing module 125 can comprise an act 230 of generating human-readable output. Act 230 includes generating human-readable output that describes what occurs when processing the object in accordance with each different configuration. For example, FIG. 1B shows that executive processing module 125 generates one or more files 140 that comprise human-readable information corresponding to the processing activities of subscribed processing modules 120a and 120c.

In addition to the foregoing, FIG. 3 illustrates that an additional or alternative method from the perspective of the overall system 100 can comprise an act 300 of receiving a client request for application processing. Act 300 includes receiving a client request over a network, wherein the client request is to be handled by an application program. For example, FIG. 1B shows that system 100 receives client request 145 over a network layer 102 to an application layer 103. In this case, client request 145 is directed for processing by an application program that incorporates a finite state machine model, such as as a web server or firewall, etc. having one or more state machines 105.

FIG. 3 also shows that the method from the perspective of system 100 can comprise an act 310 of identifying a state machine to handle the client request. Act 310 includes identifying a state machine in the application program to handle the client request with a plurality of processing modules. For example, of the various available state machines 105a, 105b, and 105c shown in FIG. 1A, FIG. 1B shows that state machine 105a is selected for processing the client request 145.

In addition, FIG. 3 shows that the method from the perspective of system 100 can comprise an act 320 of processing the client request through a processing module with no human-readable output. Act 320 includes processing the client request at least in part through one of the plurality of processing modules of an initial state machine, wherein no human-readable output is generated regarding processing activities of the processing module. For example, FIG. 1B shows that state machine 105a processes client request 145 at least in part through processing modules 120b and 120d, which generate no human-readable output regarding their corresponding processing activities.

Furthermore, FIG. 3 shows that the method from the perspective of system 100 can comprise an act 330 of processing the client request through a processing module with human-readable output. Act 330 includes processing the client request at least in part though instructions corresponding to another processing module in the plurality of processing modules, wherein human-readable output is generated regarding processing activities of the other processing module. For example, FIG. 1B shows that executive processing module 125 processes client request 145 through alternate state machine 130 on behalf of subscribed modules 120a and 120c. Furthermore, FIG. 1B shows that executive processing module 125 generates one or more output files 140 based on the processing activities for subscribed processing modules 120a and 120c.

Accordingly, FIGS. 1A through 3 illustrate a number of components and mechanisms by which a system can more efficiently process objects/request in a state machine model environment. Along these lines, at least one preferred implementation involves all of the given processing modules for a particular state machine subscribing to the executive processing module, and hence being processed through the alternate state machine 130 generated or determined by the executive processing module 125. Of course, implementations of the present invention also accommodate gradual configurations in this direction.

As discussed herein, this means that some processing modules can be processed using older state machine models, while other processing modules can be handled through the alternate state machines and the executive processing module. Thus, implementations of the present invention provide a great deal of efficiency and functionality to systems. Furthermore, implementations of the present invention further provide a flexible and useful structure that significantly aids in development of new processing modules for any given state machine.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. At an executive processing module in an application program in a computerized environment comprising a plurality of processing modules that process objects in accordance with a state machine model, a method of the executive processing module alternately processing one or more objects on behalf of at least some of processing modules, comprising the acts of:

subscribing to each of a plurality of events that occur during processing of an initial state machine, wherein the initial state machine comprises a plurality of processing modules that process one or more objects based on one or more of the events;

receiving one or more subscriptions from one or more of the processing modules, wherein each subscribed processing module comprises a different configuration;

processing a object based on each different configuration in the one or more subscribed processing modules; and generating human-readable output that describes what occurs when processing the object in accordance with each different configuration.

2. The method as recited in claim 1, wherein each different configuration is based at least in part on the events subscribed to by the corresponding processing module.

3. The method as recited in claim 2, wherein each different configuration comprises a subscription to less than all of the plurality of different events that occur during processing of the initial state machine.

4. The method as recited in claim 1, further comprising an act of generating one or more alternate state machines for processing the object in lieu of the subscribed processing modules.

5. The method as recited in claim 4, wherein the one or more alternate state machines comprise the same instructions as those in the subscribed processing modules.

6. The method as recited in claim 4, wherein the act of generating one or more alternate state machines further comprises generating one or more rules and one or more actions corresponding to instructions found in each subscribed processing module.

7. The method as recited in claim 4, wherein the one or more alternate state machines process instructions corresponding to the one or more subscribed processing modules in a order that is different from that of the initial state machine.

8. The method as recited in claim 7, further comprising and act of determining the different order of instructions in the alternate state machine based on subscribed events in the configurations of the one or more subscribed processing modules.

9. The method as recited in claim 4, further comprising an act of receiving the object from the initial state machine.

10. The method as recited in claim 9, wherein:
the received object has been processed at least in part by one or more processing modules that are not subscribed to the executive processing module; and
the received object is processed at least in part through the initial state machine.

11. The method as recited in claim 10, wherein the one or more non-subscribed processing modules each comprises a different configuration having different event subscriptions than those of each subscribed processing module.

12. The method as recited in claim 9, wherein the act of processing the object in the one or more subscribed processing modules further comprises processing the object at least in part through the alternate state machine.

13. The method as recited in claim 12, further comprising an act of, upon at least partly processing the object through the alternate state machine, passing the object back to the initial state machine for additional processing.

14. In a computerized system comprising one or more application programs having one or more state machines that each process a client request with a plurality of processing modules based on one or more events, a method of processing the same network-based client request through multiple different state machines, comprising the acts of:
receiving a client request over a network, wherein the client request is to be handled by an application program;
identifying a state machine in the application program to handle the client request with a plurality of processing modules;
processing the client request at least in part through one of the plurality of processing modules of an initial state machine, wherein no human-readable output is generated regarding processing activities of the processing module; and
processing the client request at least in part through an alternate state machine comprising instructions corresponding to another processing module in the plurality of processing modules and that is managed by an executive processing module that is not part of the initial state machine, wherein human-readable output is generated regarding processing activities of the other processing module.

15. The method as recited in claim 14, wherein the processing module in the initial state machine comprises a configuration including subscriptions only to one or more events that occur during processing of the initial state machine.

16. The method as recited in claim 15, wherein the other processing module represented by instructions in the alternate state machine comprises a configuration that includes:
a subscription to less than all of the events that occur during processing of the initial state machine; and
a subscription to the executive processing module;
wherein the executive processing module is subscribed to all of the events.

17. The method as recited in claim 14, wherein:
the initial state machine comprises a first ordering of a plurality of subscribed processing modules for processing the client request; and
the alternate state machine comprises an alternate ordering of the plurality of subscribed processing modules.

18. The method as recited in claim 14, further comprising the acts of:
identifying that other processing module is subscribed to an executive processing module; and
passing the client request to the executive processing module in lieu of processing at the other processing module in the initial state machine.

19. At an executive processing module in an application program in a computerized environment comprising a plurality of processing modules that process objects in accordance with a state machine model, a computer program storage product having computer-executable instructions stored thereon that, when executed, cause one or more processors in the computerized environment to perform a method comprising:
subscribing to each of a plurality of events that occur during processing of an initial state machine, wherein the initial state machine comprises a plurality of processing modules that process one or more objects based on one or more of the events;
receiving one or more subscriptions from one or more of the processing modules, wherein each subscribed processing module comprises a different configuration;
processing a object based on each different configuration in the one or more subscribed processing modules; and
generating human-readable output that describes what occurs when processing the object in accordance with each different configuration.

20. A computer system comprising at least one processor and a storage medium having stored instructions which, when executed by the computer system, implement a method of processing a network-based client request through multiple different state machines, and wherein the method includes acts of:
receiving a client request over a network, wherein the client request is to be handled by an application program;
identifying a state machine in the application program to handle the client request with a plurality of processing modules;
processing the client request at least in part through one of the plurality of processing modules of an initial state machine, wherein no human-readable output is generated regarding processing activities of the processing module; and
processing the client request at least in part through an alternate state machine comprising instructions corresponding to another processing module in the plurality of processing modules and that is managed by an executive processing module that is not part of the initial state machine, wherein human-readable output is generated regarding processing activities of the other processing module.

21. A computer system comprising at least one processor and a storage medium having stored instructions which, when executed by the computer system, implement a method at an executive processing module at the computer system of processing one or more objects on behalf of at least some processing modules that are configured to process objects in accordance with a state machine model, and wherein the method includes the executive processing module performing acts of:

subscribing to each of a plurality of events that occur during processing of an initial state machine, wherein the initial state machine comprises a plurality of processing modules that process one or more objects based on one or more of the events;

receiving one or more subscriptions from one or more of the processing modules, wherein each subscribed processing module comprises a different configuration;

processing a object based on each different configuration in the one or more subscribed processing modules; and generating human-readable output that describes what occurs when processing the object in accordance with each different configuration.

* * * * *